United States Patent [19]

Besuden

[11] 3,827,474

[45] Aug. 6, 1974

[54] POWER COLUMN LATCH
[75] Inventor: David W. Besuden, Cincinnati, Ohio
[73] Assignee: Magnum Automotive Equipment, Inc., Cincinnati, Ohio
[22] Filed: Jan. 30, 1973
[21] Appl. No.: 328,015

[52] U.S. Cl. ............................ 157/1.28, 248/354 L
[51] Int. Cl. ............................................. B60c 25/06
[58] Field of Search ......... 157/1.17, 1.2, 1.22, 1.24, 157/1.26, 1.28; 248/354 L; 254/106

[56] References Cited
UNITED STATES PATENTS

| | | | |
|---|---|---|---|
| 2,483,388 | 9/1949 | Skidmore | 248/354 L X |
| 2,920,664 | 1/1960 | Lomen et al. | 157/1.28 X |
| 2,974,931 | 3/1961 | Reel et al. | 254/106 |
| 3,511,296 | 5/1970 | Houston et al. | 157/1.24 |

FOREIGN PATENTS OR APPLICATIONS

| 571,333 | 1/1958 | Italy | 157/1.26 |
|---|---|---|---|

*Primary Examiner*—Al Lawrence Smith
*Assistant Examiner*—Harold P. Smith, Jr.
*Attorney, Agent, or Firm*—Wood, Herron & Evans

[57] ABSTRACT

An improved power column latch for an upper bead breaker mechanism that is adapted to restrain the upper bead breaker in desired location on the power column when the power column is drawn down to break a tire's bead away from a wheel's rim on a tire changer machine. The upper bead breaker mechanism includes a collar, the collar being telescoped over and slidable relative to the substantially vertically oriented power column. The improved latch is characterized by a doughnut-shaped element that surrounds the power column, the element having an inside diameter slightly greater than the outside diameter of the power column. The doughnut-shaped element is pivotally mounted on its outer periphery, to the upper bead breaker mechanism beneath the collar. This allows the doughnut-shaped element to fall by gravity into latching engagement with the power column, thereby precluding upward movement of the upper bead breaker on the power column as the power column is drawn downwardly when breaking a bead. This also allows the doughnut-shaped element to be easily lifted out of latching engagement with the power column by an operator, thereby permitting the upper bead breaker to be manually positioned on the power column as desired by the operator and as dependent on the width of the tire being changed.

6 Claims, 4 Drawing Figures

PATENTED AUG 6 1974 3,827,474

3,827,474

POWER COLUMN LATCH

This invention relates to automatic tire changer machines. More particularly, this invention relates to an improved power column latch for an upper bead breaker mechanism on an automatic tire changer machine.

The main objective of a tire changer machine is to aid an operator in demounting a worn pneumatic tire from a wheel, and to aid an operator in mounting a new pneumatic tire onto a wheel. Generally speaking, the major structural components of an automatic tire changer machine include a horizontally disposed table on which the wheel is initially positioned, an automatically rotatable spindle that extends up from the table through the center of the wheel, and a mount/demount tool that functions to lift an old tire's beads over the rim off the wheel when the old tire is being demounted and to seat a new tire's beads over the rim onto the wheel when the new tire is being mounted. The mount/demount tool is interconnected with the machine's centerpost, and is mechanically rotated relative to the wheel by power means through that interconnection, to aid an operator in performing the tire mounting and demounting functions.

In addition to the structural components previously mentioned, the more advanced automatic tire changer machines also make use of a lower bead breaker mechanism and an upper bead breaker mechanism. As is generally known, pneumatic tires are provided with a substantial degree of air pressure inside, and that air pressure must be alleviated prior to removing the tire from the wheel. Further, and particularly in the case of tubeless pneumatic tires, the tire's upper and lower beads (as the tire lies horizontally on the machine's table) are stuck to some extent, i.e., are sealed, against the wheel's upper and lower rims. Thus, the tire's beads must be broken away from the wheel's rims prior to removing the tire from the wheel during the demounting operation. The upper and lower bead breaker mechanisms are mechanically operated by power means to perform the breaking function, i.e., to "break" the tire's upper and lower beads from the wheel's upper and lower rims. In the more advanced automatic tire changer machines the upper and lower bead breaker mechanisms are in the nature of jaws which are initially positioned adjacent the tire's upper and lower beads, respectively. Both mechanisms are then caused to move toward one another relatively simultaneously so as to compress the beads toward one another, i.e., toward the center plane of the wheel and away from the rims of the wheel, thereby breaking the tire's beads away from the wheel's rims and totally depressurizing the tire.

However, the multi-widths of pneumatic tires now being marketed by the tire manufacturers provide problems for an automatic tire changer machine in that the starting position of the upper bead breaker mechanism must be dependent on the width of the tire being demounted. Generally speaking, and because the lower bead of the tire is always adjacent the horizontal table on which it rests, the lower bead breaker mechanism starts from a fixed location and its starting or home position is not adjustable relative to the machine's table. Thus, it is the upper bead breaker mechanism which must be provided with structure that allows it to be moved up or down relative to the machine's table so that it can be positioned on the top side wall of the tire as the tire is being demounted from its wheel.

It is known in the prior art to mount the upper bead breaker mechanism to a power column, the power column delivering the compressive forces to the tire through the upper bead breaker so as to break the upper bead from the wheel's rim. One upper bead breaker mechanism known to the prior art includes a collar adapted to slide axially on the substantially vertical power column, thereby providing the desired adjustability for the upper bead breaker so the upper bead breaker can be accommodated to multiple widths. In connection with the sliding collar, however, lock means is provided that allows the collar, i.e., the upper bead breaker mechanism, to be positioned in multiple locations on the power column with the location chosen being dictated by the width tire being processed. A particular such structure is illustrated in U.S. Pat. Np. 3,511,296, issued May 12, 1970.

However, after a period of use the power column becomes dirty or rusty and this means the upper bead breaker's collar, i.e., of the bead breaker, cannot thereafter be easily moved relative to the power column. In an effort to solve this binding or sticking problem, the operator may oil or grease the column so as to promote axial movement of the bead breaker's collar when desired. Further, tire bead lubricant may be inadvertently slopped on the power column by the operator on occasion, the bead lubricant being primarily designed to lubricate the beads on the tire to promote ease of movement of the mount/demount tool about the inside periphery of the tire. This grease and/or lubricant on the power column, while in fact making for easier axial movement of the upper bead breaker mechanism along the column, presents a major problem. This major problem occurs during actual use of the upper and lower bead breaker mechanisms wherein they are forced together by the power means of the automatic tire changer machine during the breaking of the tire's beads from the wheel's rims. During this operational step, the upper bead breaker mechanism tends to ride up the power column, i.e., slippage of the bead breaker mechanism relative to the power column is promoted, because of the slippery nature of the power column which was purposely and/or inadvertently provided.

Therefore, it has been one objective of this invention to provide an improved power column latch for use with an upper bead breaker mechanism on an automatic tire changer machine, that power column latch providing positive latching engagement between the power column and the upper bead breaker mechanism to prevent sliding of one relative to the other during operational use of the upper bead breaker mechanism.

A further objective of this invention has been to provide an improved power column latch for use with an upper bead breaker mechanism on an automatic tire changer machine that is easy and foolproof to use by an operator, and that is economical to manufacture.

In accomplishing these objectives there has been provided an improved power column latch for an upper bead breaker mechanism that is adapted to restrain the upper bead breaker in desired location on the power column when the power column is drawn down to break a tire's bead away from a wheel's rim on a tire changer machine. The upper bead breaker mechanism includes a collar, the collar being telescoped over and slidable relative to the substantially vertically oriented power column. The improved latch is characterized by a doughnut-shaped element that surrounds the power column, the element having an inside diameter slightly greater than the outside diameter of the power column. The doughnut-shaped element is pivotally connected on its outer periphery, to the upper bead breaker mechanism in a location preferably just beneath the collar. This allows the doughnut-shaped element to fall by gravity into latching engagement with the power column, thereby precluding upward movement of the upper bead breaker on the power column as the power column is drawn downwardly when breaking a bead. This also allows the doughnut-shaped element to be easily lifted out of latching engagement with the power column by an operator, thereby permitting the upper bead breaker to be manually positioned on the power column as desired by the operator and as dependent on the width of the tire being changed.

The improved power column latch of this invention provides a number of advantages. Among such advantages are the fact that the power column may, indeed, be freely lubricated by an operator to overcome the binding or sticking problems (due to rust, dirt and grime) which make axial movement of the collar, i.e., the upper bead breaker mechanism, relative to the power column hard to effect by the operator during initial positioning of the upper bead breaker mechanism on the power column. That is, the latch provides a positive interconnection between the upper bead breaker mechanism and the power column that is not affected at all by a slippery column. Further, the improved latch is very easy to use by an operator in that it is preferably positioned closely adjacent a handle grasped by the operator during initial positioning of the bead breaker mechanism on the power column, and may be actuated at will by the index finger on that hand of the operator which grasps the handle. In addition, the improved latch allows a substantially infinite number of operational positions for the upper bead breaker mechanism on the power column since no direct interconnection of a tongue and notch or the like is required. Further, the improved latch is a simple device that is maintenance free with a long useful life.

Other objectives and advantages of this invention will be more apparent from the following detailed description taken in conjunction with the drawings in which.

Figure 1:
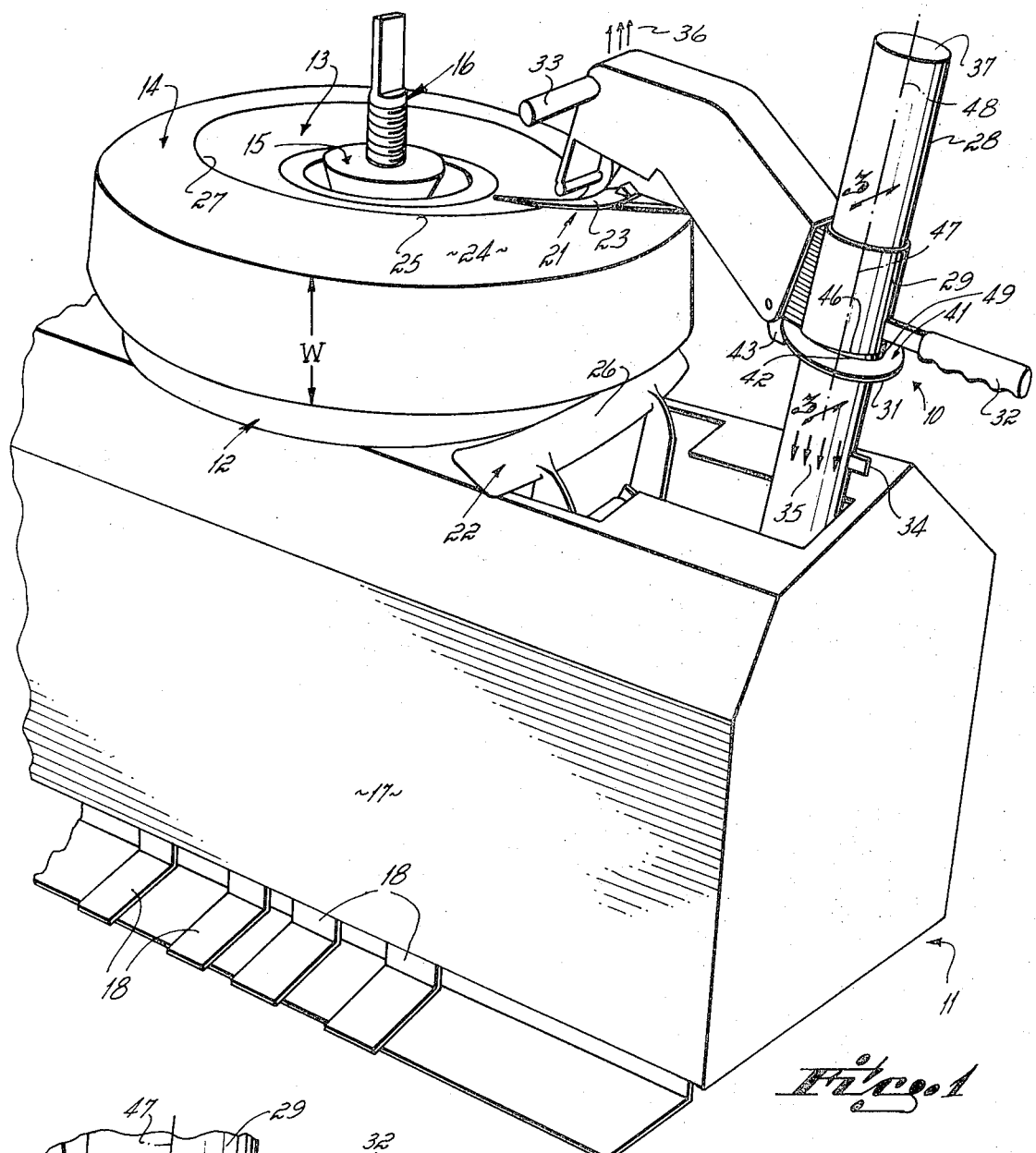
FIG. 1 is a perspective view illustrating the improved power column latch of this invention in combination with an automatic tire changer machine.

The improved power column latch 10 of this invention is illustrated in its structural environment in FIG. 1. As shown in that Figure, the improved power column latch 10 is in combination with an automatic tire changer machine 11. The automatic tire changer machine 11 includes a horizontally disposed table 12 adapted to receive a wheel 13 having a pneumatic tire 14 mounted thereon. The wheel 13 is held in position on the table 12 by a hold-down cone 15. A center spindel 16 extends upwardly through the table 12 and through the center of the wheel 13, the center spindle being adapted for clockwise or counterclockwise rotation by power means, not shown, inside the machine's shroud 17. A mount/demount tire tool, not shown, particularly adapted for use with the automatic tire changer machine is illustrated in U.S. Pat. application Ser. No. 328,010, entitled MOUNTING HEAD FOR A TIRE TOOL, invented by Donald B. Rainey, filed simultaneously herewith; the tire tool is interengaged with the center spindle 16 in a manner shown in that application. Rotation of the center spindle 16 and, hence, rotation of the tire tool (not shown) is operator controlled through foot pedals 18. The power means for rotating the center spindle 16 is particularly disclosed in U.S. Pat. application Ser. No. 328,016, entitled CENTERPOST DRIVE MECHANISM, invented by William G. Brosene, Jr., filed simultaneously herewith.

The automatic tire changer machine 11 also includes upper 21 and lower 22 bead breaker mechanisms. The upper 21 and lower 22 bead breaker mechanisms are adapted to move in a travel path toward one another that is substantially vertical to the horizontal plane of the wheel 13 as the wheel rests on the table 12. Operation of the upper bead breaker mechanism 21 is accomplished by pushing blade 23 downwardly on the tire's upper side wall 24 adjacent the tire's upper bead 25 by power means, not shown. Operation of the lower bead breaker mechanism 22 is accomplished by pushing blade 26 upwardly against the tire's lower side wall, not shown, adjacent the tire's lower bead, not shown, by power means, not shown. This upward motion of the lower bead breaker 22 and downward motion of the upper bead breaker 21 is carried out simultaneously and, in essence, serves to break or separate the tire's upper 25 and lower (not shown) beads away from the upper 27 and lower (not shown) rims of the wheel 13 on which the tire 14 is mounted. The upper 21 and lower 22 bead breaker mechanisms, and their power means, are more particularly illustrated in U.S. Pat. application Ser. No. 328,017, entitled BEAD BREAKER MECHANISM, invented by John T. Curtis, filed simultaneously herewith, and in U.S. Pat. application Ser. No. 328,008, entitled UPPER BEAD BREAKER MECHANISM, invented by William G. Brosene, Jr. and David W. Besuden, filed simultaneously herewith.

The upper bead breaker mechanism 21 is interconnected with power column 28, the power column drawing the upper bead breaker mechanism 21 downwardly against the upper side wall 24 of the tire 14 during breaking of the tire's upper bead 25 from the wheel's upper rim 27. The power column 28 is, of course, directly connected with the power means, not shown, that services the upper bead breaker mechanism 21. This interconnection of the upper bead breaker mechanism 21 and the cylindrical power column 28 is accomplished through the use of a cylindrical collar 29 that is part of the upper bead breaker mechanism, the collar having an inside diameter relative to the power column's outside diameter that allows it to be telescoped over and axially slidable relative to the power column. The slidability of the collar 29 (and, hence, the upper bead breaker mechanism 21) relative to the power column 28 provides, of course, the structure that allows the machine's operator to position the upper bead breaker's blade 23 on the top side wall 24 of the tire 14 being demounted regardless of the width W of the tire on the machine's table 12. Further, the slidability of the collar 29 relative to the power column 28, in combination with the concentricity of the collar/power column structure, allows the upper bead breaker 21 to be swung outwardly out of the way when the tire/wheel is being lifted on or off the table 12, i.e., allows the bead breaker 21 to be swung into a plane transverse to the plane in which it is shown in FIG. 1 so that it is off to the side of the table 12 where it does not impede locating the tire/wheel on or removing the tire/wheel from the table 12.

Handle 32 is permanently fixed to the upper bead breaker's collar 29, and extends radially from the collar, to aid the operator in lifting or moving the upper bead breaker mechanism 21 upwardly along the power column 28 when so desired by the operator. Note the handle 32 is located in substantially the same plane as the bead breaker mechanism 21, but on the opposite side of collar 29, thereby allowing the operator to easily lift the upper bead breaker mechanism (when it is desired to move same upwardly along the column) by grasping handle 33 fixed to the bead breaker mechanism 21 with one hand and handle 32 fixed to the collar 29 with the other hand.

A stop pin 34 is permanently and immobily fixed to the power column 28 as shown in FIG. 1. This stop pin 34 serves as a lower limit stop on the upper bead breaker mechanism 21 to limit the downward sliding movement of the upper bead breaker on the substantially vertically oriented power column 28. That is, when there is no tire/wheel on the tire changer machine's table 12, or when the upper bead breaker mechanism 21 is swung out beyond the table, the upper bead breaker mechanism will tend to slide down the column because of its relatively heavy weight. This downward travel of the upper bead breaker mechanism 21 is limited by the stop pin 34, the stop pin abutting the lower edge 31 of the power column latch 10 to stop the downward travel of the upper bead breaker 21 on the substantially vertically oriented power column 28 at the stop pin's location. Thus, the upper bead breaker mechanism may be positioned anywhere between the stop pin 34 and the top 37 of the power column, that position being dependent on the width of the tire 14 being demounted.

When the power column 28 becomes rusty or grimy through use, the operator may well lubricate the power column; this, of course, brings on the problem with the particular prior art structure discussed above. When the rusty or grimy power column situation obtains (and unless the power column 28 is lubricated or thoroughly cleaned), it is difficult for the operator to raise the upper bead breaker 21 upwardly on the power column 28 because the collar 29 tends to bind on the power column. Likewise, it is difficult to obtain the final desired location of the upper bead breaker 21 on the top side wall 24 of the tire 14 because of the difficulty in lowering the upper bead breaker on the power column 28 even though the bead breaker mechanism is a relatively heavy structure. Because the tire 14 impedes the upper bead breaker's downward movement as the power column 28 is drawn downwardly in a direction indicated by force lines 35 (in order to draw the bead breaker mechanism downwardly when it is desired to break the upper bead 25 from the wheel's upper rim 27), upward forces in a direction indicated by force lines 36 are introduced into the upper bead breaker 21. Unless the collar 29 is somehow positively fastened to the power column 29 when the operational attitude of downward power column 28 movement with upward force 36 on the upper bead breaker 21 obtains, and assuming the power column is slippery with lubricant, the upper bead breaker mechanism will tend to ride up the power column toward the top 37 thereof. The improved power column latch 10 of this invention prevents this upward riding problem of the upper bead breaker; the improved power column latch 10 provides that function in a positive manner in that it directly latches the upper bead breaker mechanism to the power column even if the power column is quite slippery with lubricant.

Figure 2:
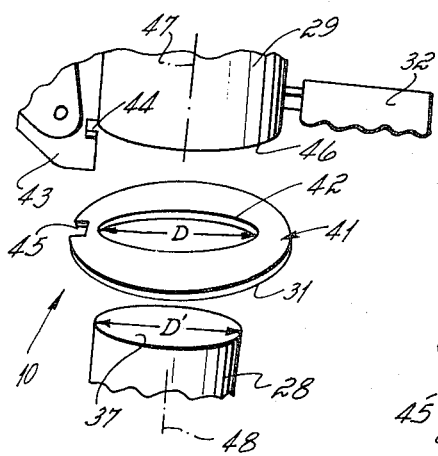
FIG. 2 is an exploded perspective view illustrating the primary structural components of the improved latch.
Figure 3:
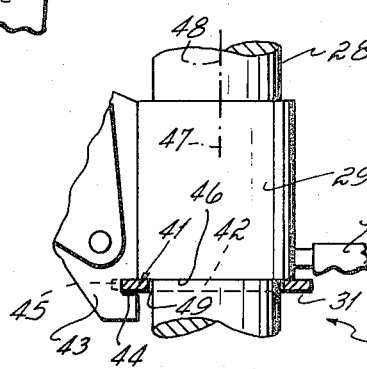
FIG. 3 is a cross-sectional view taken along lines 3—3 of FIG. 1 showing the latch in the unlatched attitude.
Figure 4:
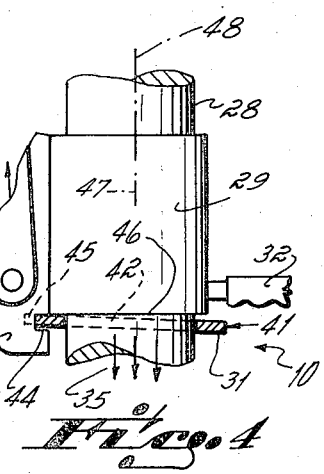
FIG. 4 is a cross-sectional view similar to FIG. 3 but showing the latch in the latched attitude.

The specific structure of the improved power column latch 10 is particularly illustrated in FIGS. 1 and 2. Note from those Figures that the latch 10 basically comprises a doughnut-shaped plate 41 that is essentially flat in configuration. The latch plate's hole 42 is circular and has an inside diameter D slightly greater than the outside diameter D' of the cylindrical power column 28, see particularly FIG. 3. The doughnut-shaped latch plate 41 is connected with the upper bead breaker's support arm 43 at notch 44, the notch being positioned just below the upper bead breaker's collar 29 on that side of the collar directly opposite the handle 32, see particularly FIG. 2. This interconnection is a pivotal interconnection in the sense that notch 45 defined in the outer periphery of the doughnut-shaped plate 41 cooperates with, and is adapted to be seated in, notch 44 defined in the upper bead breaker's frame 43; these two notches 44, 45 cooperate one with the other to define the pivotal interconnection between the doughnut-shaped latch plate 41 and the bead breaker's frame 43, and to maintain the latch plate in operational relation with the power column 28 and upper bead breaker 21, when the latch plate is in final operational position as shown in FIGS. 3 and 4. Thus, the latch plate is interconnected with the upper bead breaker's support arm 43 beneath the upper bead breaker's collar 29 immediately adjacent to the handle 32 that is fixed to the collar, thereby allowing operation of the latch plate by the index finger of that hand of an operator which grips the handle 32 at the same time the handle is being gripped as is described in detail below.

Assembly of the upper bead breaker mechanism 21, power column latch 10, and the power column 28 is relatively simple as is shown in FIG. 2. First the latch plate's notch 45 is interengaged with the upper bead breaker frame's notch 44, and the latch plate held tight against the bottom edge 46 of the upper bead breaker's collar 29 while orientating the latch plate 41 such that its hole 42 is coaxial with the collar's axis 47. The latch plate 41 is easily maintained in this position because the upper bead breaker mechanism 21 is supported by an operator who grasps handle 32 with one hand and handle 33 with the other hand, the latch plate being held in position flush against the bottom edge 46 of the collar by means of the index finger on the operator's hand that grasps handle 32. Subsequently the upper bead breaker's collar 29 and latch plate 41 are coaxially telescoped or slipped over power column 28 from the top 37 thereof, the upper bead breaker mechanism 21 sliding down the power column 28 until stopped by the limit pin 34 if there is no tire 14 on the table 12 or if the mechanism 21 is swung to the side of the table.

In use, and when it is the desire of an operator to lift the upper bead breaker mechanism 21 upwardly relative to the power column 28 for purposes of proper positioning on the top side wall 24 of a tire 14 located on the machine's table 12, the operator simply grasps handle 32 with one hand and handle 33 with the other hand. The index finger on that of the operator's hands which grasps handle 32 simply flips the latch plate 41 up into that attitude shown in FIG. 3, that attitude being the unlatching attitude. In the unlatching attitude, note particularly that the latch plate 41 is transverse to the axis 48 of the power column 28 and that there is definite peripheral clearance 49 between the hole 42 defined by the latch plate 41 and the outer periphery of the power column 28, thereby allowing the upper bead breaker mechanism 21 to be moved up or down the power column 28 since the upper bead breaker's collar 29 is sized to allow such movement. Further about this unlatching attitude, note that the latch plate 41 is located flush against the lower edge 46 of the upper bead breaker's collar 29. This provides a positive means for locating the latch plate 41 in unlatching attitude, i.e., provides means for positively positioning the latch plate in that attitude where a definite peripheral gap 49 is provided all the way around the power column 29. Thus, the operator does not have to worry about maintaining the gap 49 as he lifts the upper bead breaker 21, but can simply press the latch plate 41 as hard or as soft as desired against the collar's bottom edge 46.

When the desired vertical orientation of the upper bead breaker mechanism 21 on the power column 28 is achieved, and when the upper bead breaker's blade 23 is positioned on the tire's side wall 24, the latch plate 41 is simply released by the operator's index finger. Once released, the latch plate 41 falls into a canted or angled attitude relative to the power column's axis 48, i.e., is automatically and positively positioned in the latched attitude, see FIG. 4. This canted or angled attitude of the latch plate 41 is, as mentioned, the latched attitude, and allows inner edge surface area as at 49 to 'bite' into the power column's adjacent surface area. This 'biting' of the latch plate 41 into the power column's adjacent surface area provides a latch that positively interconnects the upper bead breaker's collar 29 (and, hence, the upper bead breaker mechanism 21) with the power column 28 as the power column is drawn down in the direction illustrated by force lines 35 in FIG. 4 while resistance to such downward movement (as shown by force lines 36) is applied to the upper bead breaker due to engagement of the upper bead breaker's plate 23 with the tire's upper side wall 24. Thus, in the latching attitude illustrated in FIG. 4, and when in operational use, the upper bead breaker mechanism 21 is positively prevented from sliding or riding up the power column 28 as the power column is drawn downwardly.

The improved power column latch 10 of this invention is operable to maintain or latch the upper bead breaker mechanism 21 in the desired location on the power column 28 when the upper 21 and lower 22 bead breakers are being pushed toward one another to break a tire's beads off a wheel's rims even if the power column has been lubricated on its exterior surface to overcome sticking or binding problems of the upper bead breaker's collar 29 with the power column. This for the reason the latch plate 41 tends to bite into the power column 28 at the desired location and, thereby, positively prevents upward movement under operational conditions of the upper bead breaker mechanism 21. Further, it will be apparent that the latch 10 is easily operable by an operator since it is located closely adjacent a handle 32 provided for raising the upper bead breaker mechanism to the desired location on the power column, since collar's edge 46 provides a positive means of positioning the latch plate 41 in the unlatched attitude, and since the latch plate 41 automatically falls by gravity into the latched attitude when it is released by an operator. Further, it will be apparent that the power column latch 10 is a very simple latch in that its only separate functional component is the latch plate 41 itself, and that the latch plate allows for an infinite variety of vertical locations for the upper bead breaker mechanism 21 relative to the power column 21 between the stop pin 34 and the power column's upper end 37.

Having described in detail the preferred embodiment of my invention, what I desire to claim and protect by Letters Patent is:

1. An improved power column latch for an upper bead breaker mechanism that is adapted to restrain said upper bead breaker mechanism in desired location on a substantially vertical power column when said power column is drawn down to break a tire's bead away from a wheel's rim, said improved latch comprising a latch element that at least substantially surrounds said power column in a concentric manner, said latch element having an inner periphery sized such that in the unlatched position a gap is established between said element's inner periphery and said column when said element is positioned in a plane transverse to said power column, said gap permitting said upper bead breaker mechanism to be manually positioned on said power column as desired by an operator, and means pivotally mounting said latch element to said upper bead breaker mechanism, said pivotal connection allowing said element to fall by gravity into a plane out of transverse alignment with said power column where a portion of said element's inner periphery contacts said power column in latching engagement to preclude upward movement of said upper bead breaker mechanism on said power column as said power column is drawn downwardly when breaking a tire's bead away from a wheel's rim, and said pivotal connection also allowing said latch element to be easily lifted out of latching engagement into a plane transverse to said power column.

2. An improved power column latch as set forth in claim 1 wherein said power column is of a circular cross section, and wherein said latch element's inner periphery is also circular, said element having an inside diameter slightly greater than the outside diameter of said power column.

3. An improved power column latch as set forth in claim 1 including a stop fixed to said upper bead breaker mechanism, said latch element being adapted to abut against said stop for locating said latch element positively in the unlatched position when it is desired to move the upper bead breaker mechanism relative to said power column.

4. An improved power column latch as set forth in claim 3 wherein said pivotal interconnection comprises a notch in said upper bead breaker mechanism, and
a notch defined in the outer periphery of said latch element, said notches being seated one within the other when said latch element is operationally engaged with said power column.

5. An improved power column latch as set forth in claim 1, said upper bead breaker mechanism including a collar that is telescoped over and slidable relative to said power column, and said latch element being pivotally mounted to said upper bead breaker mechanism beneath said collar, and including a handle fixed to said collar adjacent said latch element, said latch element being positioned such that same may be easily lifted out of latching engagement with said power column by the index finger of that hand of an operator which grasps said handle as the operator manually positions said upper bead breaker mechanism on said power column.

6. An improved power column latch as set forth in claim 5 wherein said handle is located in substantially the same plane as said upper bead breaker mechanism but on the opposite side of said power column.

* * * * *